A. SOBEY.
COMBINED COUPLING AND CLAMP.
APPLICATION FILED OCT. 12, 1911.
1,038,012.
Patented Sept. 10, 1912.
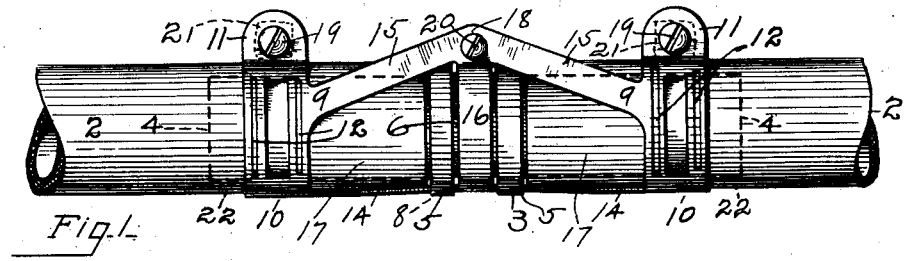
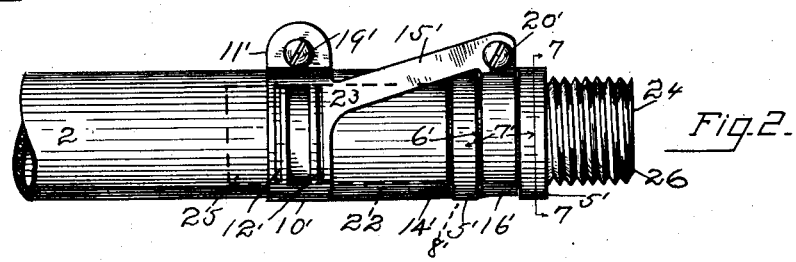
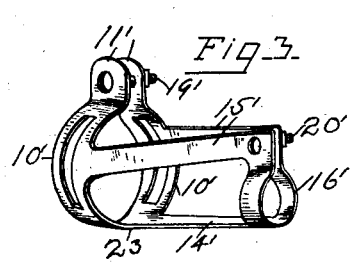
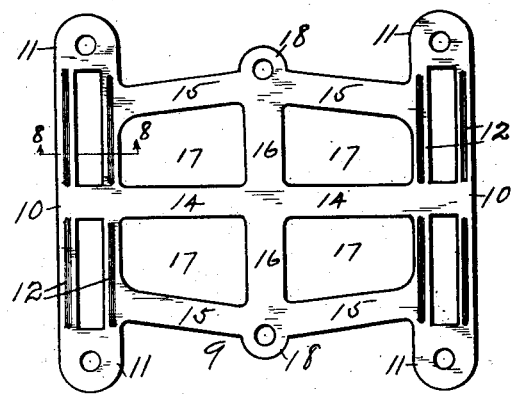
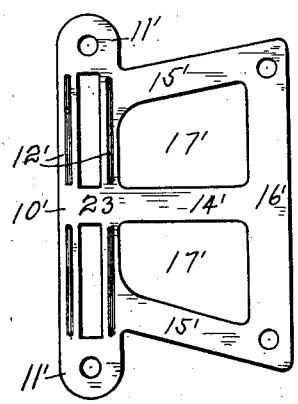
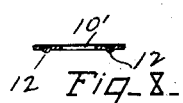
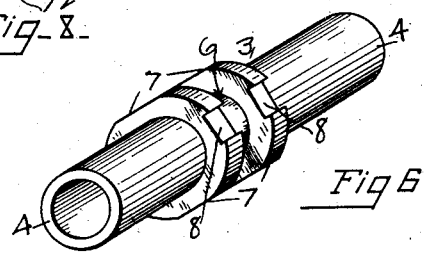
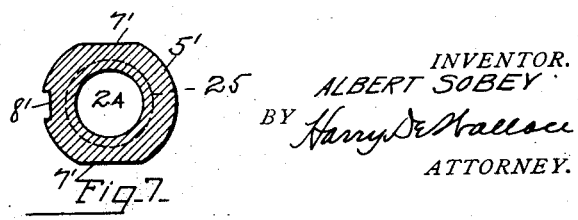
WITNESSES
INVENTOR.
ALBERT SOBEY
BY
ATTORNEY.

UNITED STATES PATENT OFFICE.

ALBERT SOBEY, OF SYRACUSE, NEW YORK.

COMBINED COUPLING AND CLAMP.

1,038,012.  Specification of Letters Patent.  Patented Sept. 10, 1912.

Application filed October 12, 1911. Serial No. 654,329.

*To all whom it may concern:*

Be it known that I, ALBERT SOBEY, citizen of the United States, residing at Syracuse, in the county of Onondaga and State of New York, have invented certain new and useful Improvements in Combined Couplings and Clamps, of which the following is a specification.

This invention relates to improvements in combined couplings and clamps, designed for use in connection with hose or other flexible piping.

The object of the invention is to provide a novel, simple, strong and convenient combination fitting consisting of a tubular bushing or part adapted for insertion into and coupling a section or length of hose with another part, and a clamping member comprising a sheet metal part, which is capable of being folded or wrapped around the ends of the hose and also a part of the said coupling, whereby the hose and coupling are securely clamped and held from longitudinal as well as circumferential movement. And a further object is to provide a combined coupling and clamp, which may be applied to and removed from the hose in a quick and ready manner, and which may be used repeatedly without breaking or wearing out.

The features and parts of the invention will be fully understood from the sub-joined description and by reference to the accompanying drawing, which forms a part of this specification, and in which—

Figure 1 is an elevational view; showing two sections of hose joined together by means of my improved coupling and clamp. Fig. 2 is a similar view; showing a section of the hose attached to a nipple, to which a nozzle or other device may be connected. Fig. 3 is a perspective view of the single clamp shown in Fig. 2. Fig. 4 is a plan view of the double clamp shown in Fig. 1. Fig. 5 is a plan view of the single clamp. Fig. 6 is a perspective view of the double coupling. Fig. 7 is a cross section on line 7—7 of Fig. 2. Fig. 8 is a sectional view on line 8—8 of Fig. 4.

Similar characters of reference designate corresponding parts throughout the several views.

In the drawing, 2 represents like pieces or lengths of hose or pipes, which may be made of any suitable material, as rubber or fabric. 3 represents a coupling member which comprises a tubular part, having cylindrical ends 4, adapted to be inserted in the ends of the hose 2, for coupling the same together. Intermediate the ends of the member 3, like outwardly facing annular flanges 5, are arranged, to provide stops for limiting the insertion of the coupling, and the space between the said flanges comprises an annular groove 6. Each of the flanges or ribs 5 has corresponding flattened portions 7, arranged at its opposite sides, for receiving a wrench or other instruments for twisting or turning the coupling. Each of the flanges 5 has a notch 8 formed in its peripheral face for receiving parts of a clamping member.

The member 3 is intended for connecting or coupling two sections of hose. The opposite ends of said member are therefore formed substantially alike and should be of suitable diameter for effecting a tight fit when driven or otherwise forced into the ends of the hose. The coupling member 3, when applied to the hose, as described, is incapable of holding the parts together so as to withstand rough handling, or the application of a strong fluid pressure. It is therefore necessary to provide additional means for preventing the breaking of the joints. To hold the double coupling member 3 and also the hose sections in service position, I provide a novel and simple metal clamping member 9, which is preferably made out of tough and pliable sheet metal by means of suitable dies, which produce a latticed device, such as shown in Fig. 4. The member 9 is preferably designated as a double clamp which, is adapted especially for clamping the adjacent ends of two sections of the hose, as shown in Fig. 1. When acted upon by the dies the clamp 9 formed with like slotted end bands or portions 10, which are arranged at right angles to the longitudinal axis of the plate, the opposite ends of said bands comprising perforated lugs 11. Each of said bands has a series of concavo-convex ribs 12, arranged on the side facing of the hose, and the said ribs are intended to be embedded in the outer surface of the hose, when the clamp is applied, for preventing longitudinal movement of the parts. The clamp 9 is also provided intermediate its ends 10 with a central longitudinal bar 14, and also with angular side bars 15, and at or near the middle of the said plate is disposed a transverse bar 16, all of the said parts being integral and formed by cutting away portions of the web of the plate, for providing a number of openings 17, which serves to reduce the weight, and at the same time facilitates the bending or rolling of the plate to conform to the curved outer surface of the hose. The opposite ends of the transverse bar or band 16 project slightly beyond the angular bars 15, for providing perforated lugs 18. After the clamp is stamped out, as shown in Fig. 4, it is rolled or bent around the abutting ends of the hose and also around the exposed central portion of the coupling 3, until the several lugs 11 and 18 are brought close enough together to receive bolts 19 and 20, which are fitted with nuts 21, and by means of which the clamp is secured in place. In applying the clamp 9 to the joint of the hose, the central transverse band or bar 16 is disposed in the groove 6 of the coupling, and the central longitudinal bars 14 are disposed in the notches 8 of the flanges 5. The tightening up of the bolts 19 draws the bands 10 tightly against the outer surface of the hose sections 2, and the tightening up of the bolt 20 draws the band 16 tightly in the groove 6. The coöperation of the combined device is such that, when the clamp 3 is applied as described, it is impossible for either the clamp, the coupler, or the hose sections to be displaced or moved in either direction. Under this construction and arrangement, the clamping member 9, as well as the coupling 3, will be rigidly held in place and against longitudinal movement, and by the arrangement of the clamping bands 10, having the narrow ribs 12, the hose 2 will also be held from longitudinal movement. In practice, when the coupler is applied to the hose, the ends 4 project beyond the clamping bands 10, as shown by the dotted lines 22 in Figs. 1 and 2. By loosening up and removing the bolts 19 and 20, the clamp 9 may be removed, and then the coupling 3 may be withdrawn from the ends of the hose, and all of these parts may again be applied, in a ready manner, without damage or injury to any of the parts.

Figs. 2, 3, and 5 illustrate what is designated as the single clamp 23, which is employed in connection with a nipple bushing 24, the latter having one end formed into a plain tube 25, (see dotted lines 22) which is inserted in the end of the hose, the opposite end being threaded at 26, for connecting with a nozzle or some other device, (not shown). The member 23 follows the same construction as the member 9, excepting that it has but one hose clamping band, 10′, having perforated ends 11′, to receive bolts 19′, and its opposite end comprises the transverse band or bar 16′, which is connected to the band 10′ by a central bar 14′ and angular side bar 15′, the band 16′ being perforated at its opposite ends to receive a bolt 20′. The nipple coupling 24 is provided intermediate its ends with spaced flanges 5′, for providing a circumferential groove 6′ to receive the band 16′ of the clamp, each of which is flattened at 7′ for applying a wrench for screwing the nipple into another part. One of the flanges 5′ is provided with a notch 8′ to receive the central bar 14′. The clamping band 10′ of the member 23 is also provided with inwardly facing ribs 12′, for engaging the outer surface of the hose. The construction and application of the single clamping member 23, are substantially the same as described for the double clamp 9.

My improvement is especially adapted for coupling and clamping air, steam and water-hose, where high pressures are employed. When the coupling members are properly inserted and fitted into the ends of the hose, the joints will not leak under ordinary pressure, and when the flexible clamping members are constructed and applied as herein shown and described, the joints will stand the highest pressure, and it will be impossible for either the hose or the coupling parts to become detached, or the joints to become loosened, and owing to the provision of the flanges and grooves in the intermediate portions of the coupling members, the clamps will also be held from longitudinal or other movement.

It is obvious that some changes or modifications may be made in the parts of the device, within the scope defined by the appended claims without departing from the spirit of the invention.

Having thus described my invention, what I claim as new and desire to secure by Letters Patent, is—

1. A coupling device, comprising a tubular part adapted to be inserted part way in the ends of two pieces of hose so as to leave the central portion exposed, said exposed part having notched parallel circumferential flanges disposed intermediate its ends for limiting the insertion of said part in the hose, and a clamp, comprising a latticed flexible member, adapted to be folded around and to clamp the end of the hose and also the exposed portion of said tubular part, said clamp having an integral transverse band adapted to lie between said flanges and grip said tubular part for preventing longitudinal movement thereof, said clamp having a longitudinal bar adapted to engage the notches of said flanges for preventing circumferential movement of the coupling parts.

2. A hose coupling, comprising a tubular bushing, having cylindrical end portions adapted for insertion into the ends of two pieces of hose, said bushing having spaced circumferential flanges, formed intermediate its ends for limiting the insertion of said cylindrical end portions in the hose, and a clamping member adapted to encircle and clamp the adjacent ends of said hose, and having a transverse bar adapted to engage the said flanges for interlocking said bushing with said clamping member.

3. A combined coupling and clamp, comprising a tubular bushing adapted to be inserted part way into the end of a hose, the exposed portion of said bushing having parallel flanges spaced apart to provide a circumferential groove, said flanges having peripheral notches, a clamping member for holding said bushing in the hose, comprising a latticed flexible plate, having perforated end bands, adapted to encircle the hose for clamping the same to the bushing, and having a transverse band adapted to lie in the groove of said bushing, and having a longitudinal bar adapted to engage the notches in said flanges, and bolts for securing the adjacent ends of said bands for drawing the said plate tightly around the hose.

4. The combination with a flexible clamping member adapted to be folded around a piece of hose, and a series of bolts for clamping said member to the hose, of a coupling member comprising a tubular bushing adapted to be inserted part-way into the end of the hose for preventing the crushing of the hose when said clamp is drawn tight, the exposed portion of said coupling member having longitudinal and circumferential grooves adapted to receive integral portions of said clamping member, for interlocking and holding said coupling member from movement in any direction.

5. The combination with a tubular coupling member adapted to be inserted part way into a section of hose, the exposed portion of said coupling member having spaced circumferential flanges, of a clamping member comprising a flexible latticed plate having a perforated band adapted to encircle, and to clamp the hose to said coupling member, said band having a plurality of ribs for engaging the outer surface of the hose, said clamping member having a plain integral band adapted to encircle said coupling member between the said flanges, for interlocking the said parts against longitudinal or circumferential movement.

6. A combined coupling and clamp, comprising a tubular coupling member adapted to be inserted in the ends of two sections of hose, the middle portion of said member provided with spaced peripheral flanges for stopping the ends of the hose, the space between the said flanges comprising an annular groove, a clamp comprising a flexible metal member adapted to be folded around the hose and said coupling, said clamping member having end bands for encircling and clamping the hose to the ends of said coupling, said clamping member having a transverse band adapted to lie in the groove between the said flanges for preventing longitudinal movement of said clamp, and a series of bolts piercing the ends of said bands for securing the clamp in place.

In testimony whereof I affix my signature in presence of two witnesses.

ALBERT SOBEY.

Witnesses:
 HARRY DE WALLACE,
 E. C. WRIGHT.

---

Copies of this patent may be obtained for five cents each, by addressing the "Commissioner of Patents, Washington, D. C."